(12) United States Patent
Arakawa

(10) Patent No.: US 6,595,078 B2
(45) Date of Patent: Jul. 22, 2003

(54) TRANSMISSION APPARATUS FOR VEHICLE

(75) Inventor: Hidetoshi Arakawa, Iwata-Gun (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/989,404

(22) Filed: Nov. 21, 2001

(65) Prior Publication Data

US 2002/0062703 A1 May 30, 2002

(30) Foreign Application Priority Data

Nov. 24, 2000 (JP) ........................................ 2000-358246

(51) Int. Cl.⁷ ............................................. F16H 61/16
(52) U.S. Cl. ....................................... 74/337.5; 74/357
(58) Field of Search .............................. 74/337.5, 344, 74/357, 358, 363

(56) References Cited

U.S. PATENT DOCUMENTS

| | | | | |
|---|---|---|---|---|
| 4,620,453 A | * | 11/1986 | Kumazawa ................. | 74/337.5 |
| 4,635,506 A | * | 1/1987 | Imaizumi et al. .......... | 74/337.5 |
| 4,658,661 A | * | 4/1987 | Terashita ................... | 74/337.5 |
| 4,713,979 A | * | 12/1987 | Muto et al. ................ | 74/337.5 |
| 4,730,506 A | * | 3/1988 | Kageyama ................. | 74/337.5 |
| 4,754,662 A | * | 7/1988 | Misawa ..................... | 74/337.5 |
| 4,879,919 A | * | 11/1989 | Sekizaki .................... | 74/337.5 |

FOREIGN PATENT DOCUMENTS

JP 59-147144 A * 8/1984

\* cited by examiner

*Primary Examiner*—Ankur Parekh
(74) *Attorney, Agent, or Firm*—Oblon, Spivak, McClelland, Maier & Neustadt, P.C.

(57) ABSTRACT

There is provided a transmission apparatus for a vehicle, which is arranged between a counter shaft and a drive shaft disposed in an engine unit of the vehicle, the transmission apparatus having a simple and compact structure and ease operability and permitting to achieve a reliable transmission respectively between forward gears and reverse gear to thereby make power transmission loss as small as possible and improve controllability of a gearshift fork for the reverse gear.

8 Claims, 8 Drawing Sheets

Forward State

Neutral State

Reverse (Rearward) State

Reverse State

Forward State

TRANSMISSION APPARATUS FOR VEHICLE

BACKGROUND OF THE INVENTION

The present invention relates a multistage type transmission apparatus for a vehicle, which has forward gears and reverse (backstep) gears.

There has been a motorcycle or a small-sized vehicle such as a saddle-seat type having three or four-wheeler (for example, an off-road buggy), which is provided with a multistage transmission gear train serving as a transmission apparatus and having a plurality of forward gears and a single reverse gear.

In general, the forward gears of such a transmission apparatus constitute a return-type or rotary-type transmission mechanism in which a foot-operated forward shift lever is swung by a prescribed number of times to thereby turn stepwisely (in stages) a gearshift cam included in the transmission apparatus so as to drive a plurality of gearshift forks in turn, thus carrying out a switching operation for the gears. A switching operation to the reverse gear is carried out, on the other hand, by shifting first the forward gears to a neutral position and then turning an exclusive reverse shift lever provided independently to a reverse position.

Maintenance of the neutral position of the forward gears is prerequisite for making a shifting operation to the reverse gear. Accordingly, there is provided a shift restriction mechanism for restricting the shifting operation to the reverse gear, when the forward gears are shifted to the forward position, thus not being kept in the neutral position.

The above-mentioned shift restriction mechanism may not only make the transmission apparatus complicated and large-sized, but also disable a shifting operation to the reverse gear. When the shifting operation to the reverse gear is conducted, the reverse gear rotates integrally with the drive shaft through connection of a dog clutch to transmit power to a driving wheel. Collision of gears of the dog clutch, however, disables operation (swing) of the reverse shift lever. A rider must therefore keep the reverse shift lever in the reverse position until the reverse gear turns slightly to provide a reliable connection condition of the dog clutch, leading to a nuisance and an unease operability.

SUMMARY OF THE INVENTION

An object of the present invention is to solve or eliminate such defects or disadvantages as those in the prior art mentioned above and to provide a transmission apparatus for a vehicle, capable of providing a simple and compact structure and ease operability and permitting to achieve a reliable transmission respectively between forward gears and reverse gear to thereby make power transmission loss as small as possible and improve controllability of a gearshift fork for the reverse gear.

The above and other objects of the present invention can be achieved by providing a transmission apparatus for a vehicle having an engine unit housed in an engine case in which a crankshaft extends in a vehicle width direction, a clutch mechanism is disposed on one side thereof, a counter shaft and a drive shaft are disposed in parallel to each other behind the crankshaft and a transmission apparatus is provided for the counter shaft and the drive shaft, the transmission apparatus comprising:

a multistage transmission gear train provided for the counter shaft and the drive shaft to be in parallel to the crankshaft, the multistage transmission gear train including forward gears and a reverse gear;

a forward gearshift cam for controlling a switching operation of the forward gears, the forward gearshift cam being provided, on an outer periphery thereof, with a flange portion integrally formed therewith, the flange portion being formed with an arcuate cutout on a peripheral portion thereof; and a reverse gearshift cam for controlling a switching operation of the reverse gear, the reverse gearshift cam being located in a vicinity of the forward gearshift cam so as to be in parallel thereto, the reverse gearshift cam being formed with a tongue-shaped projection on an outer periphery thereof so as to be engageable with the cutout of the forward gearshift cam, wherein positions of the cutout and the projection in a circumferential direction are determined so that the reverse gearshift cam is permitted to turn to a reverse position at a time only when the forward gearshift cam turns to a neutral position, and at a time when the reverse gearshift cam turns to a reverse position, at least a portion of the projection engages with the cutout to prevent the forward gearshift cam from turning to a position other than the neutral position.

Preferred embodiments or examples of the present invention of the above aspect will additionally include the following characteristic features.

The projection has one peripheral side which faces the forward gearshift cam when the reserve gearshift cam is kept in a position other than the reverse position so as to provide substantially a straight line, and when the reserve gearshift cam is kept in the position other than the reverse position, the projection has a shape, which is determined so as to satisfy either one of conditions of (i) the one peripheral side passing through between the forward gearshift cam and the reverse gearshift cam to coincide substantially with a tangential line between an outer peripheral surface of the flange portion of the forward gearshift cam and an outer peripheral surface of the reverse gearshift cam and (ii) the one peripheral side being placed on a side of the reverse gearshift cam relative to the tangential line.

The transmission apparatus further comprises a pressing device for imparting force for turning the reverse gearshift cam around an axial line thereof in a direction for carrying out a reverse switching operation of the reverse gear to the reverse gearshift cam.

The cutout has a length in an axial direction of the forward gearshift cam, the length being determined so as to be substantially identical to a total value of a slide amount of a gearshift fork driven by the reverse gearshift cam to be slidable and a thickness of the projection.

The transmission apparatus may further comprise an auxiliary transmission gearshift cam for an auxiliary transmission gear train, which is provided coaxially with the reverse gearshift cam. The auxiliary transmission gearshift cam is shifted relative to the forward gearshift cam in an axial direction thereof.

The reverse gear of the multistage transmission train is arranged in the vicinity of an inner wall of an engine case, and the forward gear is provided with the first speed gear arranged in the vicinity of the reverse gear. The clutch mechanism is provided on an opposite side of the reverse gear and the first speed gear of the forward gears relative to the inner wall of the engine case.

According to the structures and characteristic features of the present invention mentioned above, in the case where the forward gearshift cam is arranged to the forward position, the reverse gearshift cam is not turned to the reverse position, and on the contrary, the reverse gearshift cam is arranged to the reverse position, the forward gearshift cam is not turned to any position other than the neutral position. It is therefore possible to achieve a reliable restrictive transmission between the forward gears and the reverse gear with a simple and compact structure of the transmission apparatus, and hence, a good and reliable operability can also be ensured.

According to the preferred embodiments or examples, it is possible to minimize a required amount of turning motion of the reverse gearshift cam to the reverse position so as to provide a good operability, while preventing the projection of the reverse gearshift cam from interfering with the forward gearshift cam, when the forward gearshift cam is put in the forward position.

Furthermore, in the arrangement of the pressing device, the pressing device continues pressing the reverse gearshift cam in the direction for carrying out the reverse switching operation until connection of the dog clutch is surely completed, even when the collision of the gears of the dog clutch occurs during the shifting operation to the reverse gear. It becomes unnecessary for a rider to keep the reverse shift lever in the reverse position, thus improving operability.

According to the specific length in an axial direction of the forward gearshift cam, which is determined so as to be substantially identical to (or larger than) a total value of a range in which a gearshift fork driven by the reverse gearshift cam is slidable, and a thickness of the projection, the reverse gearshift cam becomes not only turnable, but also slidable in the axial direction, improving controllability of the gearshift fork for the reverse gear.

Still furthermore, the arrangement of the common gearshift cam shaft permits to support, to be rotatable, the reverse gearshift cam and the auxiliary transmission gearshift cam to reduce the number of components and effectively use a space in the engine case, thus achieving a simple and compact structure of the transmission apparatus.

In the arrangement, in which the auxiliary transmission gearshift cam is shifted relative to said forward gearshift cam in an axial direction thereof, it is possible to prevent interference between the forward gearshift cam and the auxiliary transmission gearshift cam with the result that it is unnecessary to provide any restriction device for prevention of interference, thus further contributing to simplification of the transmission apparatus.

Still furthermore, in an arrangement, in which the reverse gear of the multistage transmission is placed in the vicinity of an inner wall of the engine case, and the first speed gear of the forward gears is placed in the vicinity of the reverse gear, it is possible to relieve a large transmission torque, which is applied to the reverse gear and the first speed gear of the forward gears, into the inner wall of the engine case. Flexure and torsion of the counter shaft and the drive shaft can therefore be prevented, thus making power transmission loss as small as possible.

According to the location of the clutch mechanism at the position mentioned above, it is possible to minimize the distance between the clutch mechanism, and the reverse gear and the first speed gear of the forward gears, so as to prevent occurrence of flexure and torsion of the counter shaft to which the clutch mechanism is connected, thus more effectively avoiding the power transmission loss.

It is further to be noted that the nature and further characteristic features of the present invention will be made more clear from the following descriptions made with reference to the accompanying drawings.

BRIEF DESCRIPTION OF THE DRAWINGS

In the accompanying drawings:

FIGS. 4A, 4B and 4C illustrate positions of a forward gearshift cam and a reverse shift cam in the forward, neutral and reverse states, respectively;

DESCRIPTION OF THE PREFERRED EMBODIMENTS

There is, hereunder, provided an embodiment of a transmission apparatus according to the present invention which is applied to an engine unit of a four-wheeled saddle-seat type vehicle (i.e., an off-road buggy), for example.

Figure 1:
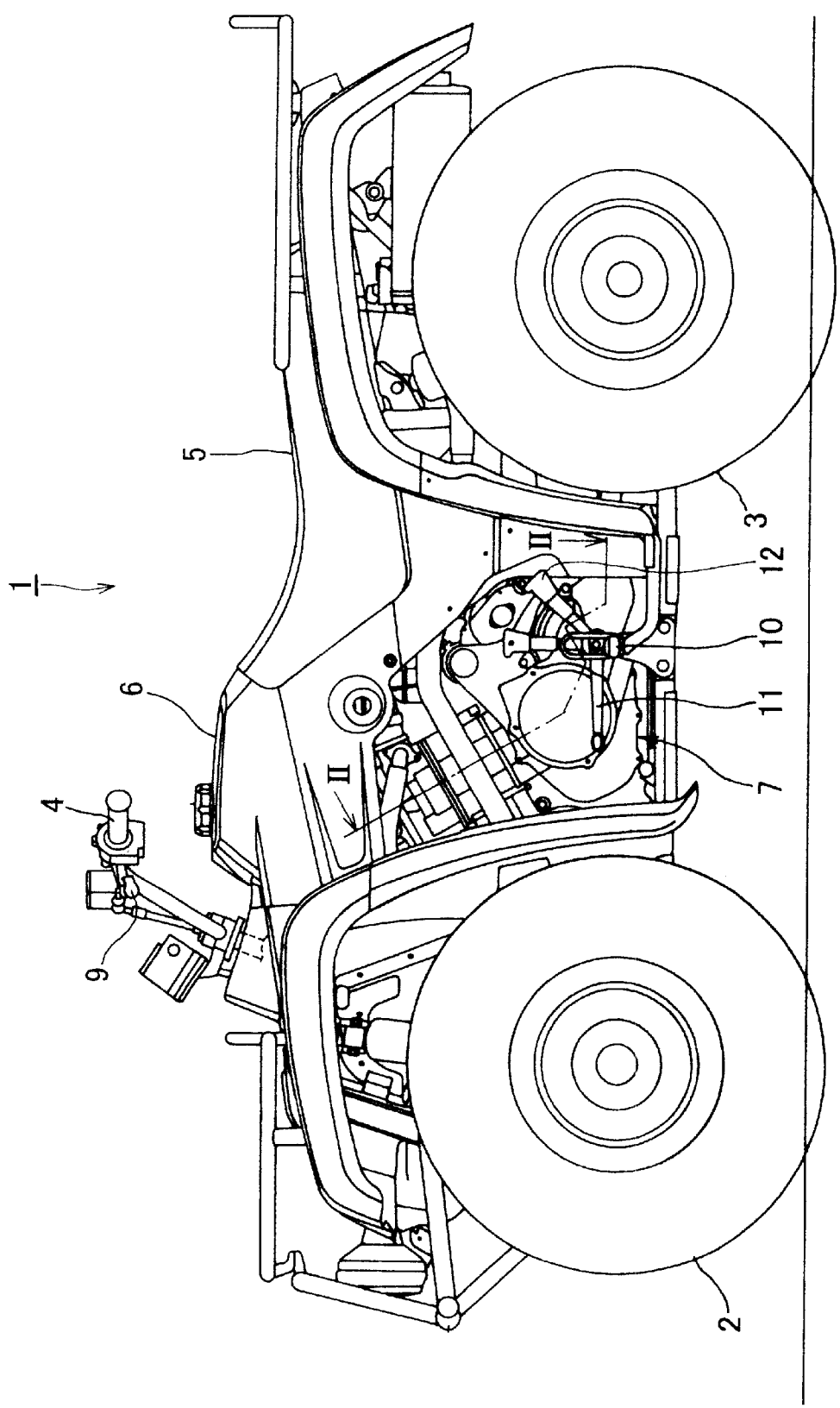
FIG. 1 is a left-hand side view of a saddle-seat type motor four-wheeler to which the transmission apparatus of the present invention is applicable.

A four-wheeled saddle-seat type vehicle shown in FIG. 1 comprises: front wheels 2 and rear wheels 3, which have low-pressure balloon tires having a relatively large diameter and a relatively large width, and are provided at four corners of a body frame, not shown; a handle bar 4 for steering provided above the front wheels 2; and a saddle seat 5 provided above and ahead of the rear wheels 3. A fuel tank 6 is mounted ahead of the saddle seat 5. An engine unit is mounted below the fuel tank 6 so as to be close to the center of gravity of a vehicle body between the front and rear wheels 2 and 3. Power of the engine unit 7 drives the front and rear wheels 2 and 3.

The handle bar 4 is provided at its left-hand portion with a rear brake lever 9 and at its right-hand portion with a front brake lever and a throttle grip for controlling output of the engine unit 7. In addition, a pair of footrests 10, on which feet of a rider seating on the saddle seat 5 are to be put, is provided on the opposite side surfaces the engine unit 7. A foot-operated forward shift lever 11 for performing a switching operation of forward gears of a transmission apparatus described below in detail and a hand-operated multiple operation lever 12 for performing a switching operation of a reverse gear and a transmission operation of an auxiliary transmission gear train also described below, as well as a parking-lock operation.

Figure 2:
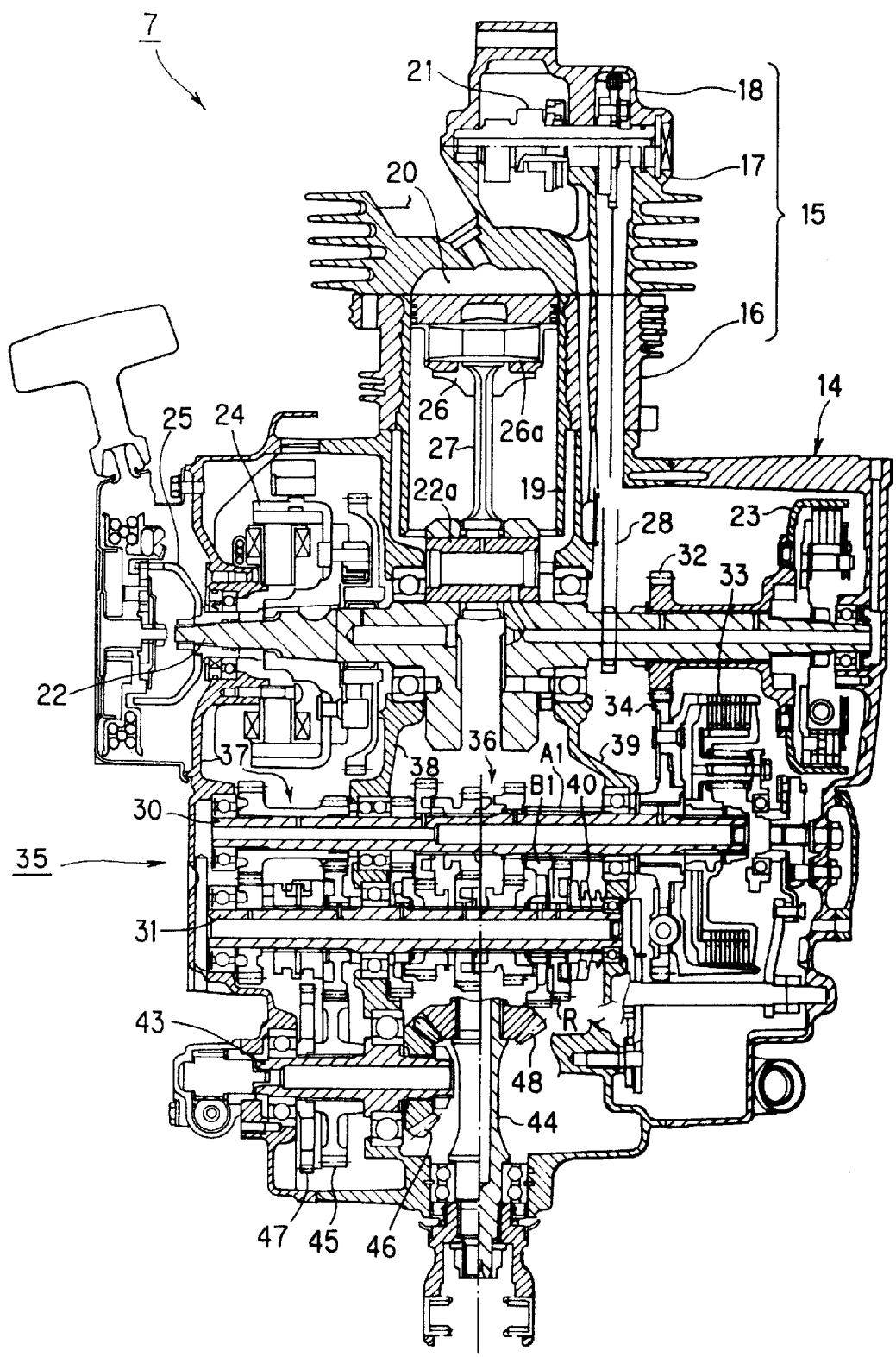
FIG. 2 is a cross-sectional view taken along the line II—II in FIG. 1.

The engine unit 7, which is, for example, of a four-cycle single cylinder type, has an engine case 14 (also called the "crankcase" or "mission case") and a cylinder assembly 15 provided above and ahead of the engine case 14, as shown in FIG. 2, which is a cross-sectional view of the engine unit 7 in a developed state along the line II—II in FIG. 1.

The cylinder assembly 15 is composed of a cylinder block 16, a cylinder head 17 and a head cover 18. The cylinder block 16 has a cylinder bore 19 formed therein. The cylinder head 17 has a combustion chamber 20 formed therein so as to be aligned with the above-mentioned cylinder bore 19. In addition, the cylinder head 17 has a camshaft 21 rotatably supported therein and includes a valve gear (not shown).

In addition, a crankshaft 22 is rotatably supported on the front side in the engine case 14 so as to be placed along the transverse direction of the vehicle body. A centrifugal starting clutch mechanism 23 is provided on the right-hand side of the crankshaft 22, and a generator 24 and a recoil starter 25 are provided on the left-hand side thereof. A piston 26 (a piston pin 26a) assembled into the cylinder bore 19 is connected to the crankshaft 22 (a crank pin 22a) through a connecting rod 27 so that a reciprocal motion of the piston 26 in the cylinder bore 19 is converted into a rotational motion of the crankshaft 22, thus providing output of the engine unit 7. The rotational motion of the crankshaft 22 is transmitted also to the camshaft 21 by means of a cam chain 28, thus driving the above-mentioned valve gear.

A counter shaft 30 is rotatably supported behind the crankshaft 22 so as to be in parallel therewith, and a drive shaft 31 is rotatably supported behind the counter shaft 30 so as to be in parallel therewith. A primary drive gear 32, which is provided on the right-hand end of the crank shaft 22 and rotates together with the starting clutch mechanism 23, engaged with a primary driven gear 34, which is provided on the right-hand end of the counter shaft 30 and rotates together with a multiple disk clutch mechanism 33 (which is operated in an interlocking relation with operation of the forward shift lever 11). The transmission apparatus 35 of the present invention is provided for the counter shaft 30 and the drive shaft 31.

Figure 3:
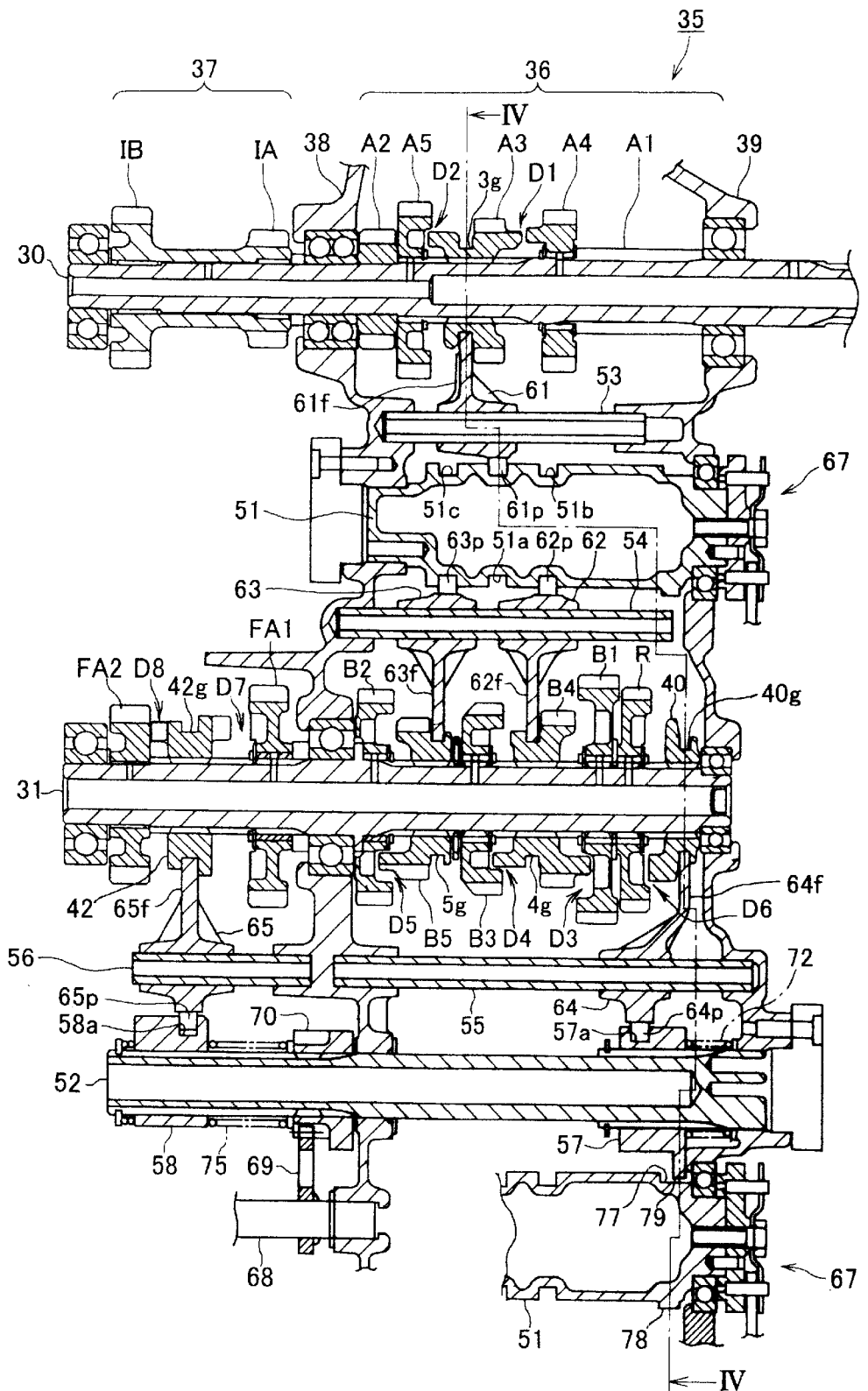
FIG. 3 is a plan view illustrating the transmission apparatus in a developed state.

The transmission apparatus 35 has a structure provided with a multistage transmission gear train 36 including, for example, five forward gears (A1 to A5 and B1 to B5) and a single reverse gear (R), and an auxiliary transmission gear train 37 for performing a switching operation of gear ratios of the entirety of the multistage transmission gear train 36 into a low range or a high range, as shown in FIG. 3.

The multistage transmission gear train 36 has the following components, i.e., a drive gear A1 for the forward first speed provided on the counter shaft 30 so as to be slightly shifted towards the right-hand side relative to a center in the transverse direction of the vehicle body, as well as a drive gear A4 for the forward fourth speed, a drive gear A3 for the forward third speed, a drive gear A5 for the forward fifth speed and a drive gear A2 for the forward second speed, which are provided on the counter shaft 30 towards the left hand side in this order. These drive gears A1 to A5 are placed in the engine case 14 so as to be disposed between a pair of inner walls 38 and 39 by which the crankshaft 22, the counter shaft 30 and the drive shaft 31 are rotatably supported.

The drive gear A1 is formed integrally with the peripheral surface of the counter shaft 30 so as to be rotatable together with it. The drive gear A2 is also rotatable together with the counter shaft 30. The drive gear A3 is rotatable together with the counter shaft 30 and is slidable in the axial direction thereof. The drive gears A4 and A5 are rotatable relative to the counter shaft 30, but not slidable in the axial direction thereof.

A dog clutch D1 is provided between the drive gear A3 and the drive gear A4, which is adjacent to the one side of the drive gear A3, and another dog clutch D2 is provided between the drive gear A3 and the drive gear A5, which is adjacent to the other side of the drive gear A3. Slide of the drive gear A3 towards the drive gear A4 provides a connection condition of the dog clutch D1 so that the drive gear A4 can rotate together with the counter shaft 30. On the other hand, slide of the drive gear A3 towards the drive gear A5 provides a connection condition of the dog clutch D2 so that the drive gear A5 can rotate together with the counter shaft 30.

In addition, there are mounted on the drive shaft 31 not only driven gears B1 to B5, which always engage with the drive gears A1 to A5 of the counter shaft 30, respectively, but also a reverse driven gear R, which engages with the drive gear A1 through a reverse idle gear, not shown. A reverse gear sleeve 40 is also mounted on the drive shaft 31 so as to be adjacent to the right-hand side of the reverse driven gear R.

The reverse driven gear R and the driven gears B1, B2 and B3 are rotatable relative to the drive shaft 31, but not slidable in the axial direction thereof. The driven gears B4 and B5 are rotatable together with the drive shaft 31 and slidable in the axial direction thereof. A dog clutch D3 is provided between the driven gear B4 and the driven gear B1, which is adjacent to the one side of the driven gear B4, and another dog clutch D4 is provided between the driven gear B4 and the driven gear B3, which is adjacent to the other side of the driven gear B4.

Slide of the driven gear B4 towards the driven gear B1 provides a connection condition of the dog clutch D3 so that the driven gear B1 can rotate together with the drive shaft 31.

On the other hand, slide of the driven gear B4 towards the driven gear B3 provides a connection condition of the dog clutch D4 so that the driven gear B3 can rotate together with the drive shaft 31.

In addition, a dog clutch D5 is provided between the driven gear B5 and the driven gear B2, which is adjacent to the left-hand side of the driven gear B5. Slide of the driven gear B5 toward the driven gear B2 provides a connection condition of the dog clutch D5 so that the driven gear B2 can rotate together with the drive shaft 31.

The reverse gear sleeve 40 is also rotatable together with the drive shaft 31 and slidable in the axial direction thereof. A dog clutch D6 is provided between the reverse gear sleeve 40 and the reverse driven gear R. Slide of the reverse gear sleeve 40 in the left-hand direction provides a connection condition of the dog clutch D6 so that the reverse driven gear R can rotate together with the drive shaft 31.

The auxiliary transmission gear train 37 is arranged on the opposite side to the multistage transmission gear train 36 having the above-described structure (i.e., the left-hand side) relative to the left-hand inner wall 38 in the engine case 14. The auxiliary transmission gear train 37 has the following components, i.e., idle gears IA and IB, which are mounted on the counter shaft 30 so as to be rotatable relative thereto and are rotatable with each other, final drive gears FA1 and FA2, which are mounted independently on the drive shaft 31 so as to be rotatable relative thereto, and an auxiliary transmission gear sleeve 42, which is arranged between the above-mentioned gears FA1 and FA2 so as to be rotatable together with the drive shaft 31 and slidable in the axial direction thereof. The final drive gears FA1 and FA2 always engage with the idle gears IA and IB, respectively.

A dog clutch D7 is provided between the auxiliary transmission gear sleeve 42 and the final drive gear FA1 and another dog clutch D8 is provided between the auxiliary transmission gear sleeve 42 and the final drive gear FA2. Slide of the auxiliary gear sleeve 42 towards the final drive gear FA1 provides a connection condition of the dog clutch D7 so that the final drive gear FA1 is rotatable together with the drive shaft 31. On the other hand, slide of the auxiliary gear sleeve 42 toward the final drive gear FA2 provides a connection condition of the dog clutch D8 so that the final drive gear FA2 is rotatable together with the drive shaft 31.

An output shaft 43, which is in parallel to the drive shaft 31, and a propeller shaft 44, which extends in the longitudinal direction of the vehicle body perpendicularly to the output shaft 43, are rotatably supported in the vicinity of the auxiliary transmission gear train 37 having the above-described structure, as shown in FIG. 2. A final driven gear 45, a bevel drive gear 46 and a parking-lock gear 47 are mounted on the output shaft 43 so as to be rotatable together therewith. A bevel driven gear 48 is mounted on the propeller shaft 44 so as to be rotatable together. The final drive gear FA1 of the auxiliary transmission gear train 37 engages with the final driven gear 45 and the bevel drive gear 46 engages with the bevel driven gear 48.

Figure 4A:
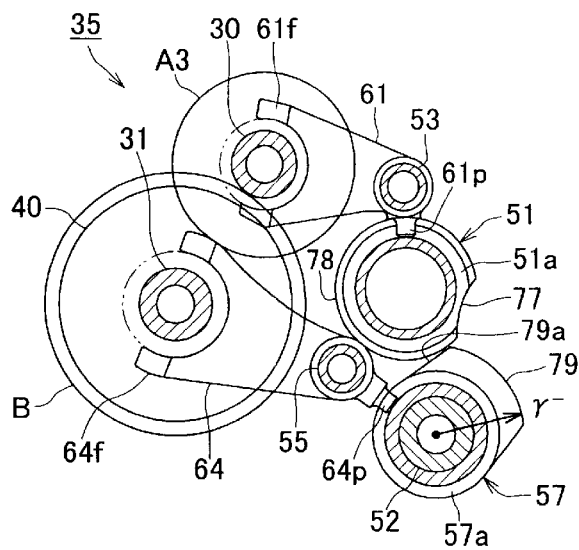
FIGS. 4A, 4B and 4C illustrate an embodiment of the present invention on a cutting plane along the line IV—IV in FIG. 3, and more specifically.
Figure 4B:
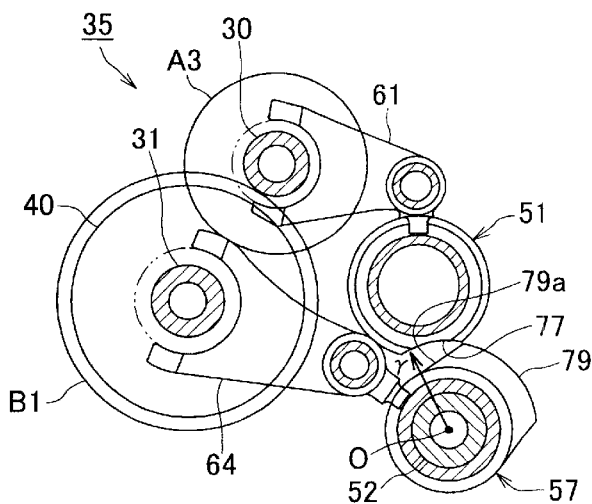
Figure 4C:
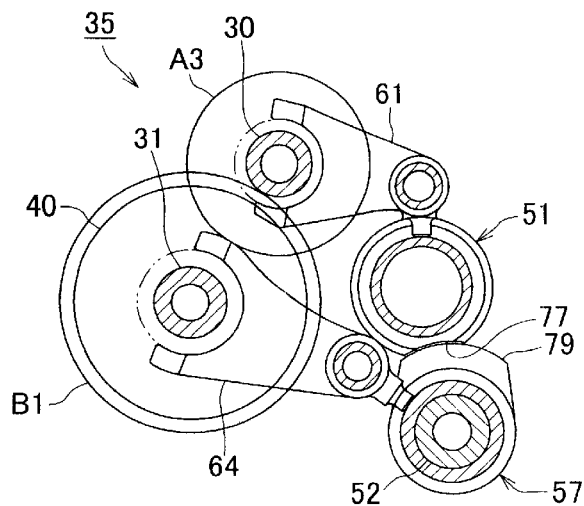

FIGS. 4A to 4C are views having a cutting plate along the line IV—IV in FIG. 3. A single forward gearshift cam 51, a single gearshift camshaft 52 and four gearshift folk shafts 53, 54, 55 and 56 are rotatably supported so as to be in parallel with the counter shaft 30 and the drive shaft 31 and adjacent to them, as shown in FIGS. 3 and 4A to 4C. A reverse gearshift cam 57 and an auxiliary transmission gearshift cam 58 are coaxially mounted on the gearshift camshaft 52. The forward gearshift cam 51 and the reverse gearshift cam 57 are close to each other in the side view (FIG. 4).

The reverse gearshift cam 57 is provided in the vicinity of the right-hand end of the gearshift camshaft 52 in the transverse direction of the vehicle body and the auxiliary transmission gearshift cam 58 is provided in the vicinity of the left-hand end of the gearshift camshaft 52 in the same direction. The reverse gearshift cam 57 and the auxiliary transmission gearshift cam 58 are rotatable together with the gearshift cam 52 and slidable in the axial direction thereof, through a spline connection mechanism. Mounting the reverse gearshift cam 57 and the auxiliary transmission gearshift cam 58 on the common gearshift camshaft 52 in this manner makes it possible to reduce the number of components and use efficiently a space in the engine case 14, thus realizing a simple and compact structure of the transmission apparatus 35.

The auxiliary transmission gearshift cam 58 is shifted leftward from the forward gearshift cam 51 in the axial direction in the plan view (FIG. 3). Shifting the forward gearshift cam 51 and the auxiliary transmission gearshift cam 58 from each other in the axial direction makes it possible to prevent interference between the both gearshift cams 51 and 58, with the result that it is unnecessary to provide any restriction device for prevention of interference. The distance between the gearshift camshaft 52 for supporting the auxiliary transmission gearshift cam 58 and the forward gearshift cam 51 can therefore be reduced, thus making a contribution to simplification of the transmission apparatus 35.

The forward gearshift cam 51 is a hollow cylindrical cam, which is provided on its peripheral surface with three meandering leading-grooves 51a, 51b and 51c formed thereon. The reverse gearshift cam 57 and the auxiliary transmission gearshift cam 58 are also provided with leading-grooves 57a and 58a, respectively. In addition, a gearshift fork 61, gearshift forks 62 and 63, a gearshift fork 64 and a gearshift fork 65 are mounted on a gearshift fork shaft 53, a gearshift fork shaft 54, a gearshift fork shaft 55 and a gearshift fork shaft 56, respectively, so as to be slidable in the axial direction thereof.

The gearshift fork shafts 53 to 56 are smoothly B fitted into the gearshift forks 61 to 65, respectively, as shown in FIGS. 3 and 4A. The gearshift forks 61 to 65 have engaging projections 61p to 65p and fork portions 61f to 65f, respectively. The engaging projections 61p, 62p and 63p of the gearshift forks 61, 62 and 63 are put into the leading-grooves 51a, 51b and 51c of the forward gearshift cam 51, respectively, so as to be slidable therealong. The engaging projection 64p of the gearshift fork 64 is put into the leading-groove 57a of the reverse gearshift cam 57 so as to be slidable therealong. The engaging projection 65 of the gearshift fork 65 is put into the leading-groove 58a of the auxiliary transmission gearshift cam 58 so as to be slidable therealong.

The fork portion 61f of the gearshift fork 61 is put into a shift groove 3g formed on the drive gear A3 of the multistage transmission gear train 36 so as to hold the drive gear A4 rotatably. The fork portion 62f of the gearshift fork 62 is put into a shift groove 4g of the driven gear B4 so as to hold it rotatably in the same manner. The fork portion 63f of the gearshift fork 63 is put into a shift groove 5g of the driven gear B5 so as to hold it rotatably in the same manner. The fork portion 64f of the gearshift fork 64 is put into a shift groove 40g of the reverse gear sleeve 40 so as to hold it rotatably in the same manner. The fork portion 65f of the gearshift fork 65 is put into a shift groove 42g of the auxiliary transmission gear sleeve 42 so as to hold it rotatably in the same manner.

In the multistage transmission gear train 36, by swinging the above-mentioned forward shift lever 11 with a left toe of a rider of the four-wheeled saddle-seat type vehicle 1, the forward gearshift cam 51 is caused to turn by steps in accordance with the number of operation, under the function of a link mechanism 67 as shown in FIG. 3. Consequently, the three gearshift forks 61, 62 and 63 move in a prescribed order on the gearshift fork shafts 53 and 54 along the meandering leading-grooves 51a, 51b and 51c formed on the peripheral surface of the forward gearshift cam 51 so as to slide the drive gear A3, the driven gear B4 and the driven gear B5 in the axial direction, thus carrying out a switching operation of the multistage transmission gear train 36. During such operation, a not-shown link mechanism automatically follows the above-mentioned stepping operation of the forward shift lever 11 to release the connection condition of the transmission clutch mechanism 33, thus blocking transfer of a rotational force of the crankshaft 22 to the counter shaft 30.

In the neutral state as shown in FIG. 3, for example, all the dog clutches D1 to D5 of the multistage transmission gear train 36 are kept in the disconnection condition. As a result, all of the drive gears A4, A5 and the driven gears B1, B2, B3 are kept rotatable relative to the counter shaft 30 and the drive shaft 31. A rotational motion of the counter shaft 30 is not therefore transmitted to the drive shaft 31, even when a connection operation of the transmission clutch mechanism is performed.

In the first speed position, the forward gearshift cam 51 moves the gearshift fork 62 rightward in the axial direction of the gearshift fork shaft 54 to slide the driven gear B4 toward the driven gear B1. Accordingly, the dog clutch D3 is kept in the connection condition so as to rotate the driven gear B1 together with the drive shaft 31. A rotational motion of the counter shaft 30 is therefore transmitted to the drive shaft 31 through the drive gear A1 and the driven gear B1. The connection or disconnection operation of each of the dog clutches D1, D2, D4 and D5 is performed in substantially the same manner so that desired gears of from the second speed gears (A2 and B2) to the fifth speed gears (A5 and B5) are selected in sequence.

A rotational motion of the drive shaft 31 is transmitted to the output shaft 43 through the auxiliary transmission gear train 37 and the final driven gear 45. A rotational motion of the output shaft 43 is input to the propeller shaft 44 through engagement of the bevel drive gear 46 and the bevel driven gear 48. A rotational motion of the propeller shaft 44 is transmitted to a differential device, not shown, for the front wheels 2 and a differential device, not shown, for the rear wheels 3 through not-shown propeller shafts. As a result, the front and rear wheels 2 and 3 are driven so as to move forward the four-wheeled saddle-seat type vehicle 1.

The manual operation, by the rider, of the multiple operation lever 12 mentioned above to a prescribed reverse position causes the gearshift cam shaft 52 to rotate through engagement of the shift drive gear 69, which is provided so as to rotate together with a rotation shaft 68 of the multiple operation lever 12 (see FIG. 3), with the shift driven gear 70 mounted on the gearshift cam shaft 52 so as to rotate together with it. Accordingly, the reverse gearshift cam 57 moves the gearshift fork 64 leftward in the axial direction of the gearshift fork shaft 55.

Figure 5:
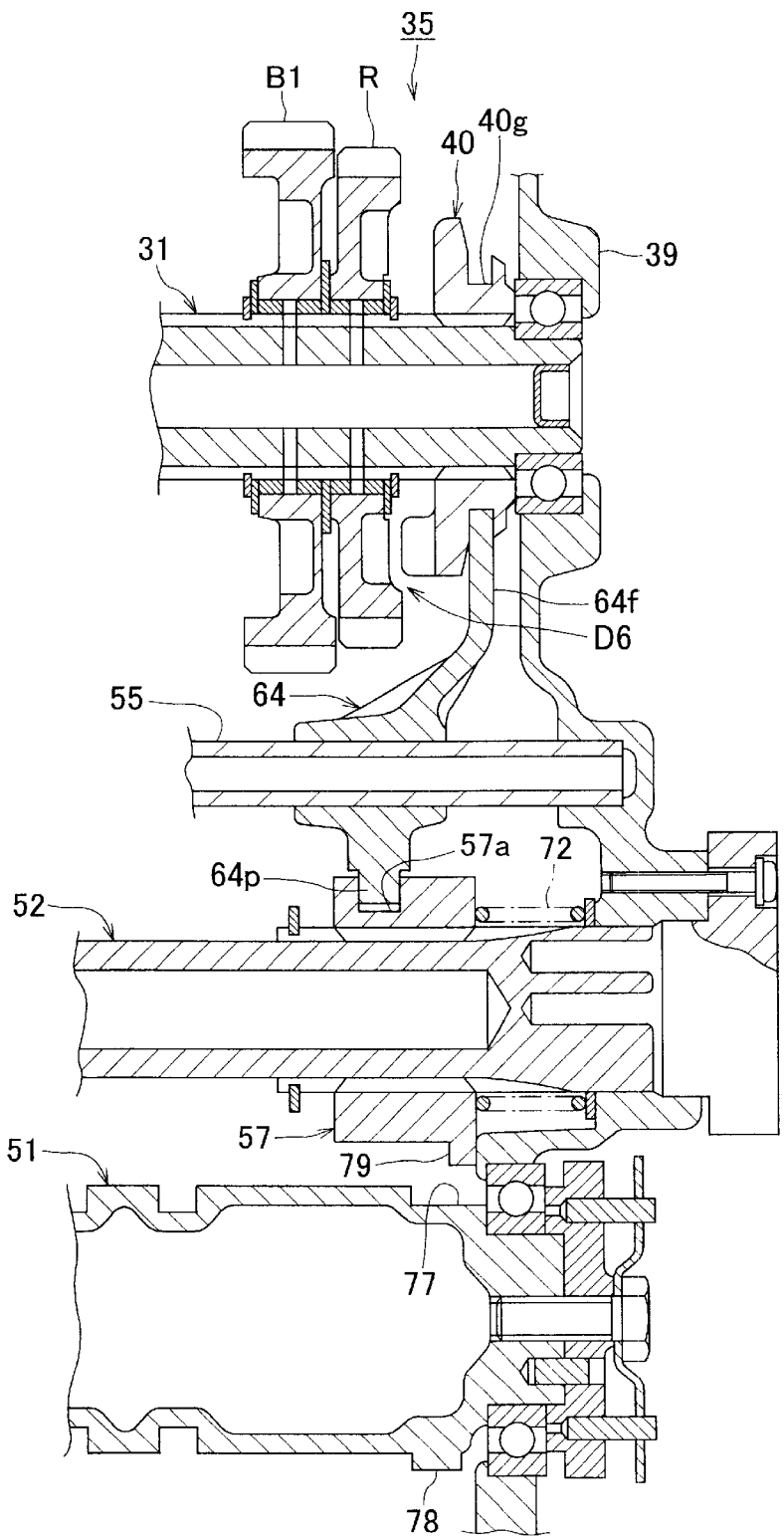
FIG. 5 is an enlarged view of a reverse driven gear together with its peripheral components in the neutral state.
Figure 6:
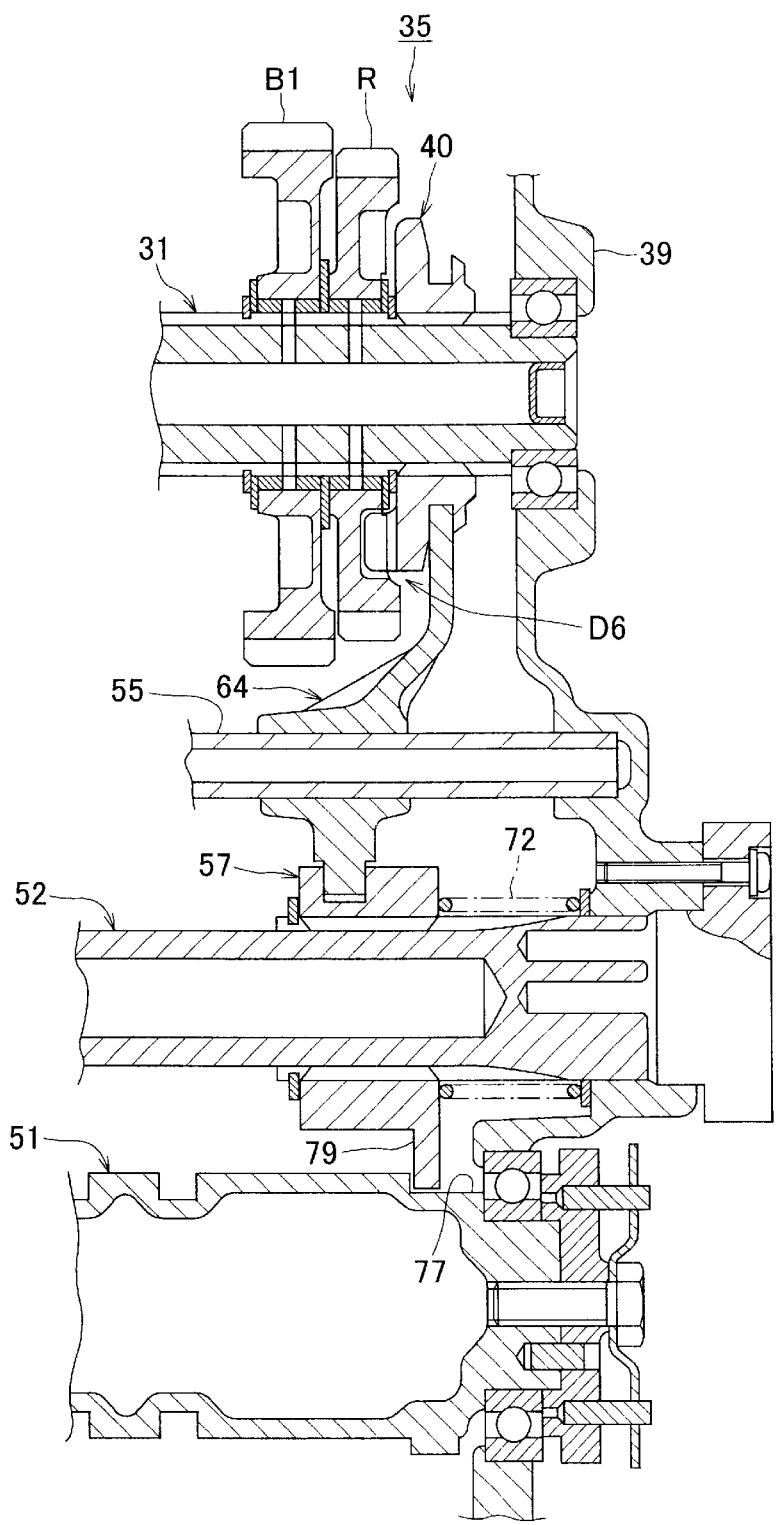
FIG. 6 is an enlarged view of the reverse driven gear together with its peripheral components in the reverse state.

As a result, the reverse gear sleeve 40 slides towards the reverse driven gear R from a position as shown in FIG. 5 to a position as shown in FIG. 6 to keep the dog clutch D6 in the connection condition so that the reverse driven gear R can rotate together with the drive shaft 31. A rotational motion of the drive gear A1 is therefore transmitted to the reverse driven gear R through the reverse idle gear (not shown) so as to rotate the drive shaft 31 reversibly, thus moving reversibly the four-wheeled saddle-seat type vehicle 1.

A coil spring 72 is mounted on the right-hand portion of the gearshift cam shaft 52 so as to be resiliently held between the right-hand inner wall 39 in the engine case 14 and the reverse gearshift cam 57, as shown in FIGS. 3, and 5 to 8. The coil spring 72 serves as the pressing device for imparting a resilient force for moving always the reverse gearshift cam 57 in a direction for carrying out the reverse switching operation, i.e., towards the left-hand side of the reverse driven gear R, to the reverse gearshift cam 57.

Figure 7:
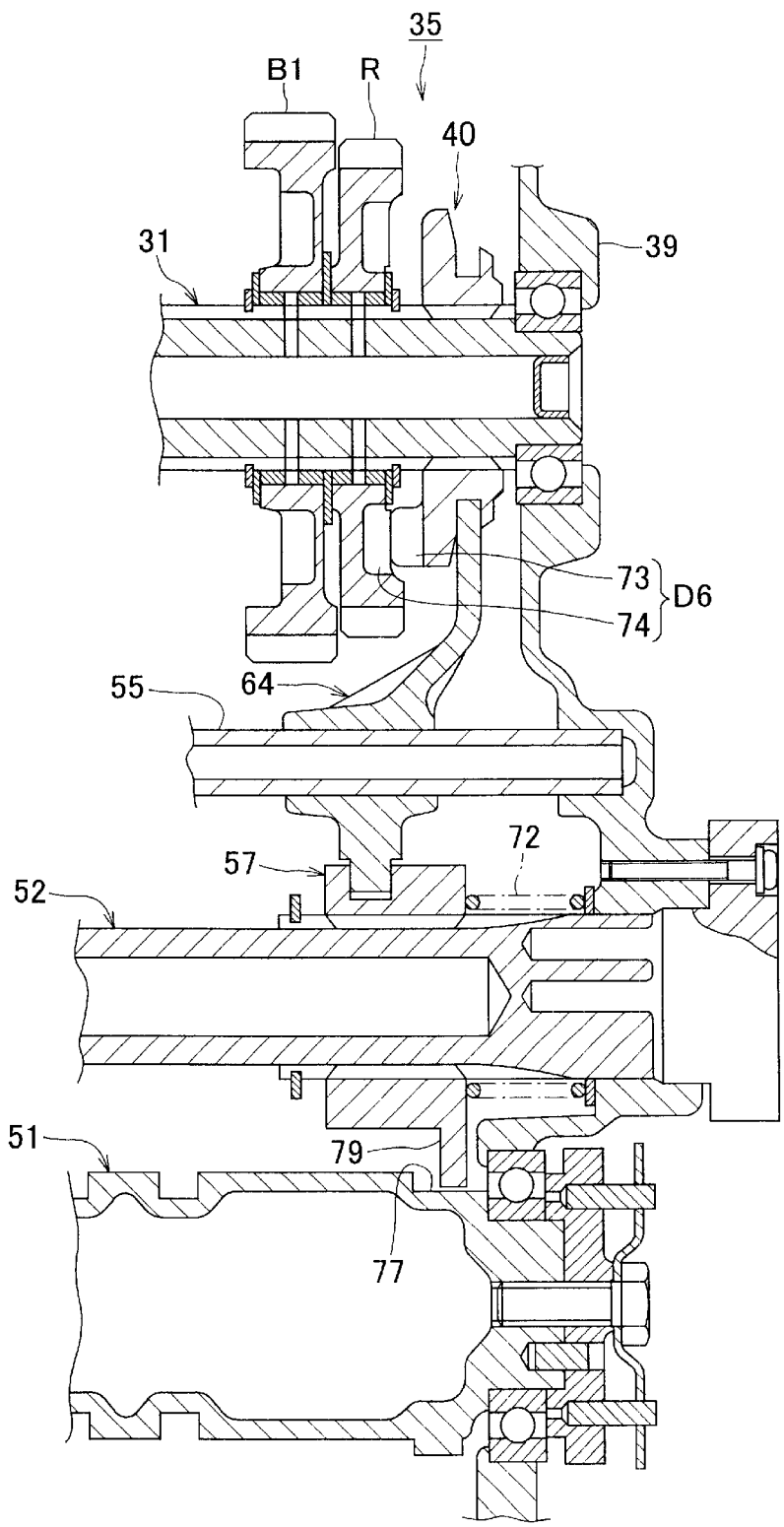
FIG. 7 is an enlarged view of the reverse driven gear together with its peripheral components in a state where gears of a dog clutch, which is proved between the reverse driven gear and a reverse gear sleeve, come into contact with each other.

Such coil spring 72 presses continuously the reverse gearshift cam 57 leftward, i.e., in the direction for carrying out the reverse switching operation, until the reverse gear sleeve 40 rotates by a slight rotational angle to complete a sure connection of the dog clutch D6, even when the collision of the gear teeth 73 and 74 of the dog clutch D6 occurs during the shifting operation to the reverse gear, as shown in FIG. 7. Therefore, it becomes unnecessary for the rider to keep the multiple operation lever 12 serving as the reverse shift lever in the reverse position, thus remarkably improving the operability.

Furthermore, operating the multiple operation lever 12 to a prescribed high-range position by the rider causes the auxiliary transmission gearshift cam 58, which is rotated together with the gearshift cam shaft 52, to move the gearshift fork 65 rightward in the axial direction of the gearshift fork shaft 56 so as to slide the auxiliary transmission gear sleeve 42 to the side of the final drive gear FA1. Consequently, the dog clutch D7 is kept in the connection condition so that the final drive gear FA1 can rotate together with the drive shaft 31.

As a result, a rotational motion of the final drive gear FA1 (i.e., a rotational motion of the drive shaft 31) is transmitted to the final driven gear 45 with an equal velocity. The output shaft 43 is driven at a reduced rotational velocity, which is slightly smaller than that of the drive shaft 31, thus providing a condition in which the gear ratio of the whole transmission apparatus 35 is set as a high range. In such a state, the idle gear IA and the idle gear IB, which engage with the final drive gear FA1, race around the counter shaft 30 and the final drive gear FA2, which engages with the idle gear IB, races around the drive shaft 31.

Alternatively, operating manually the multiple operation lever 12 to a prescribed low-range position causes the auxiliary transmission gear sleeve 42 to slide the side of the final drive gear FA2 to keep the dog clutch D8 in the connection condition so that the final drive gear FA2 can rotate together with the drive shaft 31, on the one hand, and the final drive gear FA1 can rotate relative to the drive shaft 31, on the other hand. As a result, the rotational motion of the drive shaft 31, whose velocity has remarkably been reduced through the idle gear IB and the idle gear IA, is transmitted from the final drive gear FA2 to the final drive gear FA1 and then transmitted to the final driven gear 45. The gear ratio of the whole transmission apparatus 35 is set as a low range.

A coil spring 75 mounted on the gearshift cam shaft 52 imparts a resilient force for moving always the auxiliary transmission gearshift cam 58 leftward in the axial direction of the gearshift cam shaft 52 to the auxiliary transmission gearshift cam 58, as shown in FIG. 3. The coil spring 75 presses continuously the auxiliary transmission gearshift cam 58 leftward, i.e., in the direction for carrying out the low-range switching operation, until the dog clutch D8, which has a relatively low connectability due to its existence on the low-range side, is surely kept in the connection condition, even when the collision of the gear teeth of the dog clutch D8 occurs. Therefore, it becomes unnecessary for the rider to keep the multiple operation lever 12 in the low-range position, thus improving the operability of the vehicle 1.

Alternatively, operating manually the multiple operation lever 12 to a prescribed parking-lock position causes a projection of a not-shown parking-rocking lever provided in the engine case 14 to engage with teeth of the parking-lock gear 47. As a result, the rotation of the parking-lock gear 47 and the output shaft 43 is inhibited so as to provide a parking-lock condition of the saddle-seat type motor four-wheeler 1. The auxiliary transmission gearshift cam 58 is simultaneously operated so as to relieve both the connections of the dog clutches D7, D8 provided on the opposite sides of the auxiliary transmission gear sleeve 42. This makes it possible to prevent a rotational power from being transmitted to the output shaft 43, even when the drive shaft 31 rotates.

The forward gearshift cam 51 has an arcuate recess or cutout 77 formed on the outer periphery thereof in the vicinity of the right-hand end of the forward gearshift cam 51. The arcuate recess (cutout) 77 is obtained by cutting a portion of a flange 78, which is formed into a ring-shape integrally with the outer periphery of the forward gearshift cam 51, at the curvature of radius of "r" of a circle having a center, which corresponds to the central axial line "O" of the reverse gearshift cam 57, as shown in FIG. 4B.

The reverse gearshift cam 57 is provided on its outer periphery in the vicinity of the right-hand end thereof with a tongue-shaped projection 79. The projection 79 has a height and a shape of its tip end portion, which are determined so that the tip end portion can be closely and smoothly fitted into (or engaged with) the arcuate recess 77 as shown in FIG. 4C. The tip end portion of the projection 79 has an arc coinciding with a circle having a radius "r⁻", which is slightly smaller than the above-mentioned radius "r", as shown in FIG. 4A.

Positions of the recess 77 and the projection 79 in their circumferential directions are determined so that at least a portion of the projection 79 engages with the recess 77 of the forward gearshift cam 51 only when the forward gearshift cam 51 turns to the neutral position and the reverse gearshift cam 57 turns to the reverse position, as shown in FIGS. 4C and 6. In FIG. 4B, the forward gearshift cam 51 is kept in the neutral position and the reverse gearshift cam 57 is kept in the neutral position other than the reverse position.

Figure 8:
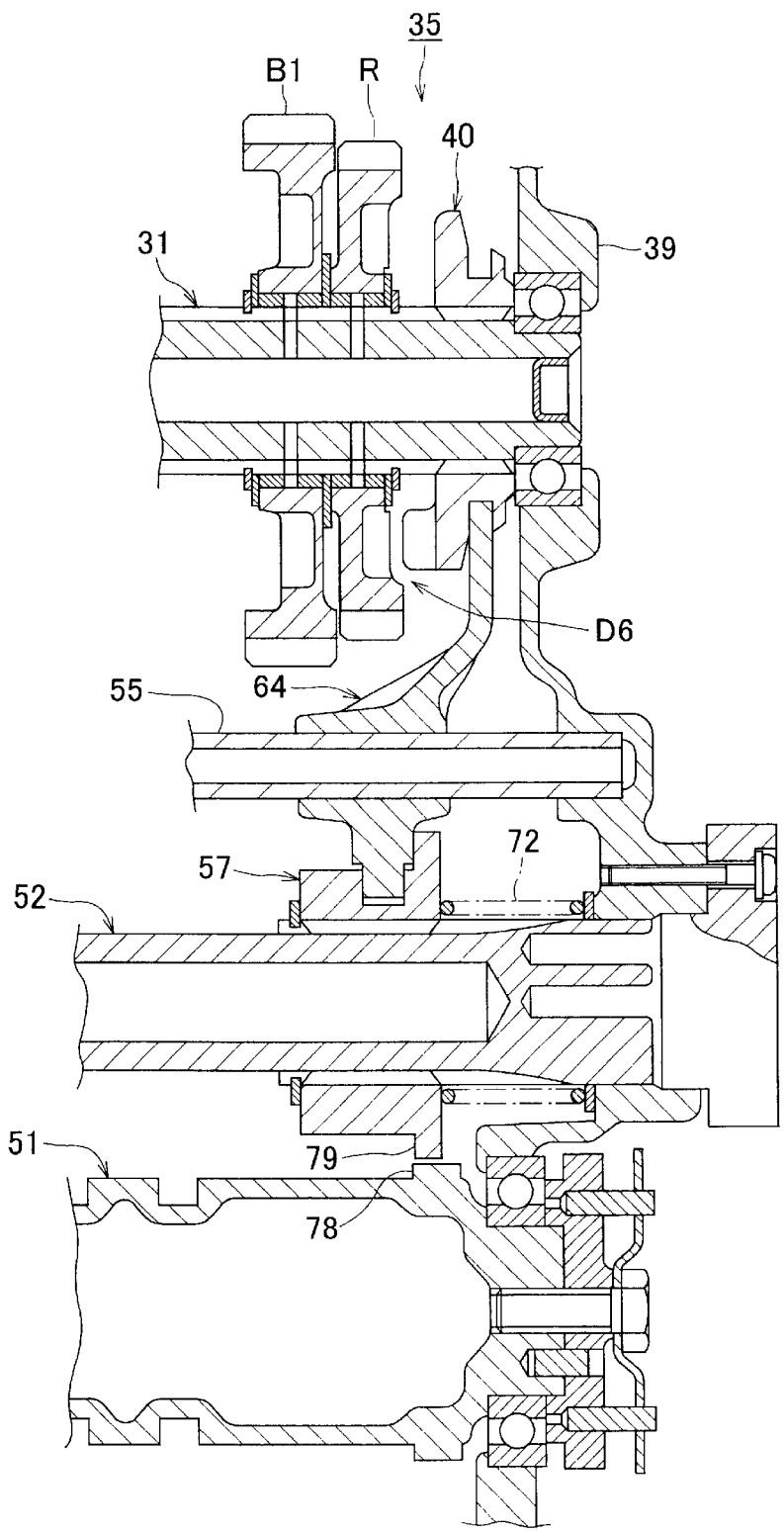
FIG. 8 is an enlarged view of the reverse driven gear together with its peripheral components in the forward state.

According to the above-described structure in which the projection 79 is engageable with the recess 77, in the case where the forward gearshift cam 51 is kept in the forward position such as the first speed position as shown in FIGS. 4A and 8, even when a force to turn the reverse gearshift cam 57 to the reverse position is applied to the reverse gearshift cam 57, the projection 79 of the reverse gearshift cam 57 abuts against the flange 78 of the forward gearshift cam 51, thus preventing the reverse gearshift cam 57 from turning.

On the contrary, in the case where the reverse gearshift cam 57 is kept in the reverse position as shown in FIG. 4C, even when force to turn the forward gearshift cam 51 to a position other than the neutral position is applied to the forward gearshift cam 51, the projection 79 of the reverse gearshift cam 57, which engages with the recess 77 of the forward gearshift cam 51, prevents the forward gearshift cam 51 from turning.

Thus, there can be avoided a situation of an erroneous shifting operation to the reverse gear in a shifted state of the multistage transmission gear train 36 to any speed position of the forward gears, or an erroneous shifting operation to any speed position of the forward gears in a shifted state of the multistage transmission gear train 36 to the reverse gear, thus achieving a reliable restrictive transmission between the forward gears and the reverse gear.

The shape of the projection 79 is previously determined so that, of opposite sides of the projection 79, one side 79a thereof, which faces the forward gearshift cam 51, passes through between the forward gearshift cam 51 and the reverse gearshift cam 57 to coincide substantially with a tangential line between the outer peripheral surface of the flange portion 78 of the forward gearshift cam 51 and the outer peripheral surface of the reverse gearshift cam 57, in the case where the reverse gearshift cam 57 is kept in any position other than the reverse position as shown in FIGS. 4A and 4B.

According to such a structure, although the projection 79 of the reverse gearshift cam 57 does not interfere with the forward gearshift cam 51 when the forward gearshift cam 51 is kept in any position other than the neutral position, the projection 79 comes extremely close to the forward gearshift cam 51. It is therefore possible to minimize an amount of turning motion of the reverse gearshift cam 57 to the reverse position. As a result, a required amount of turning motion of the multiple operation lever 12 when carrying out the shifting operation to the reverse gear can be decreased, thus remarkably improving the operability of the vehicle 1. The shape of the projection 79 may previously be determined so that the above-mentioned one side 79a of the projection 79 is slightly deviated to the side of the reverse gearshift cam 57 relative to the above-mentioned tangential line. In such a positional determination, however, a required amount of turning motion of the multiple operation lever 12 when carrying out the shifting operation to the reverse gear becomes slightly larger than the case mentioned above.

The length of the recess 77 in the axial direction of the forward gearshift cam 51 is determined so as to be identical to or larger than the total value of the range in which the gearshift fork 64 driven by the reverse gearshift cam 57 is slidable, and the thickness of the projection 79, as is clear from FIG. 6. Accordingly, the reverse gearshift cam 57 becomes not only turnable, but also slidable in the axial direction of the forward gearshift cam 51, improving the controllability of the gearshift fork for the reverse gear.

In the transmission apparatus 35 of the present invention, the reverse driven gear R serving as the reverse gear of the multistage transmission gear train 36 is arranged in the vicinity of the left-hand side of the right-hand inner wall 39 in the engine case 14 and the driven gear B1 serving as the first speed gear is placed in the vicinity of the left-hand side of the reverse driven gear R, as shown in FIG. 3. The clutch mechanism 33 is provided in the engine case 14 on the opposite side of the reverse driven gear R, the drive gear A1 and the driven gear B1 relative to the above-mentioned inner wall 39, as shown in FIG. 2.

Such a layout makes it possible to relieve a large transmission torque, which is applied to the reverse driven gear R, the drive gear A1 and the driven gear B1, into the inner wall 39 side within a small distance range. In addition, the distance between the reverse the clutch mechanism 33, on the one hand, and the reverse driven gear R and the drive gear A1, on the other hand, can also be minimized. It is therefore possible to prevent occurrence of flexure and torsion of the counter shaft 30 and the drive shaft 31, thus more effectively avoiding the power transmission loss.

It is to be noted that the present invention is not limited to the described embodiment and many other changes and modifications may be made without departing from the scopes of the appended claims.

For example, the transmission apparatus of the present invention may be applied to a transmission apparatus for not only the saddle-seat type motor four-wheeler, but also for the other type of vehicles.

What is claimed is:

1. A transmission apparatus for a vehicle having an engine unit housed in an engine case in which a crankshaft extends in a vehicle width direction, a clutch mechanism is disposed on one side thereof, a counter shaft and a drive shaft are disposed in parallel to each other behind the crankshaft, wherein the transmission apparatus is provided for the counter shaft and the drive shaft, said transmission apparatus comprising:

a multistage transmission gear train provided for the counter shaft and the drive shaft, to be in parallel to the crankshaft, said multistage transmission gear train including forward gears and a reverse gear;

a forward gearshift cam for controlling a switching operation of the forward gears, said forward gearshift cam being provided, on an outer periphery thereof, with a flange portion integrally formed therewith, said flange portion being formed with an arcuate cutout on a peripheral portion thereof; and a reverse gearshift cam for controlling a switching operation of the reverse gear, said reverse gearshift cam being located in a vicinity of the forward gearshift cam so as to be in parallel thereto, said reverse gearshift cam being formed with a tongue-shaped projection on an outer periphery thereof so as to be engageable with the cutout of said forward gearshift cam, wherein positions of said cutout and said projection in a circumferential direction are determined so that the reverse gearshift cam is permitted to turn to a reverse position at a time only when said forward gearshift cam turns to a neutral position, and at a time when said reverse gearshift cam turns to a reverse position, at least a portion of the projection engages with the cutout to prevent the forward gearshift cam from turning to a position other than the neutral position.

2. A transmission apparatus according to claim 1, wherein said projection has one peripheral side which faces the forward gearshift cam when said reserve gearshift cam is kept in a position other than the reverse position so as to provide substantially a straight line, and when the reserve gearshift cam is kept in the position other than the reverse position, said projection has a shape, which is determined so as to satisfy either one of conditions of (i) said one peripheral side passing through between the forward gearshift cam and the reverse gearshift cam to coincide substantially with a tangential line between an outer peripheral surface of the flange portion of the forward gearshift cam and an outer peripheral surface of the reverse gearshift cam and (ii) said one peripheral side being placed on a side of the reverse gearshift cam relative to said tangential line.

3. A transmission apparatus according to claim 1, further comprising a pressing device for imparting force for turning the reverse gearshift cam around an axial line thereof in a direction for carrying out a reverse switching operation of the reverse gear to the reverse gearshift cam.

4. A transmission apparatus according to claim 1, wherein said cutout has a length in an axial direction of the forward gearshift cam, said length being determined so as to be substantially identical to a total value of a slide amount of a gearshift fork driven by the reverse gearshift cam to be slidable and a thickness of said projection.

5. A transmission apparatus according to claim 1, further comprising an auxiliary transmission gearshift cam for an auxiliary transmission gear train, which is provided coaxially with the reverse gearshift cam.

6. A transmission apparatus according to claim 5, wherein said auxiliary transmission gearshift cam is shifted relative to said forward gearshift cam in an axial direction thereof.

7. A transmission apparatus according to claim 1, wherein said reverse gear of the multistage transmission train is arranged in a vicinity of an inner wall of the engine case, and said forward gears are provided with a first speed gear arranged in a vicinity of the reverse gear.

8. A transmission apparatus according to claim 7, wherein said clutch mechanism is provided on an opposite side of the reverse gear and the first speed gear of the forward gears relative to the inner wall of the engine case.

* * * * *